US012146366B2

(12) United States Patent
Machado Rainha

(10) Patent No.: US 12,146,366 B2
(45) Date of Patent: Nov. 19, 2024

(54) FRAMES FOR TURN AND TILT OR PROJECTANT DOORS OR WINDOWS

(71) Applicant: BBG, S.A, Esposende (PT)

(72) Inventor: Hugo Miguel Machado Rainha, Esposende (PT)

(73) Assignee: BBG, S.A., Esposende (PT)

( * ) Notice: Subject to any disclaimer, the term of this patent is extended or adjusted under 35 U.S.C. 154(b) by 169 days.

(21) Appl. No.: 17/772,521

(22) PCT Filed: Oct. 31, 2019

(86) PCT No.: PCT/PT2019/050040

§ 371 (c)(1),
(2) Date: Apr. 28, 2022

(87) PCT Pub. No.: WO2021/086213

PCT Pub. Date: May 6, 2021

(65) Prior Publication Data

US 2022/0381083 A1 Dec. 1, 2022

(51) Int. Cl.
*E06B 3/56* (2006.01)
*E06B 1/16* (2006.01)
*E06B 3/34* (2006.01)

(52) U.S. Cl.
CPC ................ *E06B 3/56* (2013.01); *E06B 3/341* (2013.01); *E06B 1/16* (2013.01)

(58) Field of Classification Search
CPC ... E06B 1/16; E06B 3/241; E06B 3/56; E06B 3/36
See application file for complete search history.

(56) References Cited

U.S. PATENT DOCUMENTS 4,227,346 A * 10/1980 Kubik ..................... E06B 3/222 49/504
5,666,773 A * 9/1997 Librande ........... B29C 66/73921 160/369
(Continued)

FOREIGN PATENT DOCUMENTS

CN 2767610 Y 3/2006
EP 2857626 A1 4/2015
(Continued)

OTHER PUBLICATIONS

Machine translation for WO-2017195064-A1, accessed on Dec. 12, 2023.*

*Primary Examiner* — Christine T Cajilig
(74) *Attorney, Agent, or Firm* — Rivka Friedman

(57) ABSTRACT

The present invention consists of a frame for turn & tilt or projecting doors or windows, which achieves a minimalist exterior appearance with a central profile of 18 mm, wherein the offset of the alignment of the external glass with the internal glass is now used, creating a common central outer profile of 18 mm, and wherein the thermal and acoustic performance and the resistance to water, air and wind permeability are further improved. The frame, object of the present invention, is preferably made of aluminum with thermal break for the manufacture of doors and/or windows, it is applied in a door or window opening of a building and it consists essentially of at least one fixed rim (3) and at least one movable leaf (1) and at least one fixed leaf (4), wherein at least one movable leaf is glued to the glass (2) in all its perimeter.

7 Claims, 3 Drawing Sheets

(56) References Cited

U.S. PATENT DOCUMENTS

| | | | | |
|---|---|---|---|---|
| 9,856,691 | B2 * | 1/2018 | Nielsen | E06B 7/2305 |
| 2004/0003553 | A1 * | 1/2004 | Donoghue | E06B 3/56<br>52/204.5 |
| 2015/0121764 | A1 * | 5/2015 | Lee | E05D 15/0686<br>49/420 |
| 2015/0247358 | A1 * | 9/2015 | Kim | E06B 7/28<br>49/408 |
| 2020/0109591 | A1 * | 4/2020 | Fontijn | E06B 3/26 |

FOREIGN PATENT DOCUMENTS

| | | | | |
|---|---|---|---|---|
| FR | 2445885 | A1 * | 8/1980 | |
| FR | 2993303 | A1 * | 1/2014 | E06B 1/366 |
| WO | 2007055472 | A1 | 5/2007 | |
| WO | WO-2017195064 | A1 * | 11/2017 | E05B 65/08 |

* cited by examiner

FRAMES FOR TURN AND TILT OR PROJECTANT DOORS OR WINDOWS

SUMMARY OF THE INVENTION

The present invention consists of a frame for turn & tilt or projecting doors or windows, which achieves a minimalist exterior appearance with a central profile of 18 mm, wherein the offset of the alignment of the external glass with the internal glass is now used, creating a common central outer profile of 18 mm, and wherein the thermal and acoustic performance and the resistance to water, air and wind permeability are further improved.

The frame, object of the present invention, is preferably made of aluminum with thermal break for the manufacture of doors and/or windows, it is applied in a door or window opening of a building and it consists essentially of at least one fixed rim (3) and at least one movable leaf (1) and at least one fixed leaf (4), wherein at least one movable leaf is glued to the glass (2) in all its perimeter.

FRAMEWORK OF THE INVENTION

Currently in the construction of opening, turn & tilt or projecting frames, as commonly designated, the glass is inserted, or placed, inside a movable leaf (1), while what is proposed with the present invention is that the glass (2), instead of being placed or inserted, is glued to the movable leaf (1), allowing to manufacture larger spans, wherein the movable leaves (1) can reach dimensions of 5 $m^2$ and reach equally higher weights per movable leaf (1), up to 200 kg per linear meter. The fact that the glass becomes a structural part of the movable leaf (1) allows this increase in size and weight. The fact that we can have larger turn & tilt windows with this innovation of gluing the glass (2), also eliminates the warping of aluminum profiles due to the size and weight of the glass. In addition, the thermal and acoustic performance and the resistance to water, air and wind permeability are further improved.

A second advantage in relation to the state of the art lies in the fact that turn & tilt movable leaves (1) can be combined with fixed leaves (4), having parallel planes but not coinciding, and with the central overlapping area creating a common central profile of 18 mm, since the profile of the movable leaf (1) is in the overlapping area, and therefore it is only visible from the inside, since the outside of the central profile of the movable leaf (1) is completely overlapped by the fixed leaf (4).

BRIEF DESCRIPTION OF THE FIGURES

Indication of Reference Numbers movable leaf (1);
glass (2);
fixed rim (3);
fixed leaf (4);
central seal (5);
reinforcement element (6);
fitting (7).

DESCRIPTION OF THE INVENTION

Figure 1:
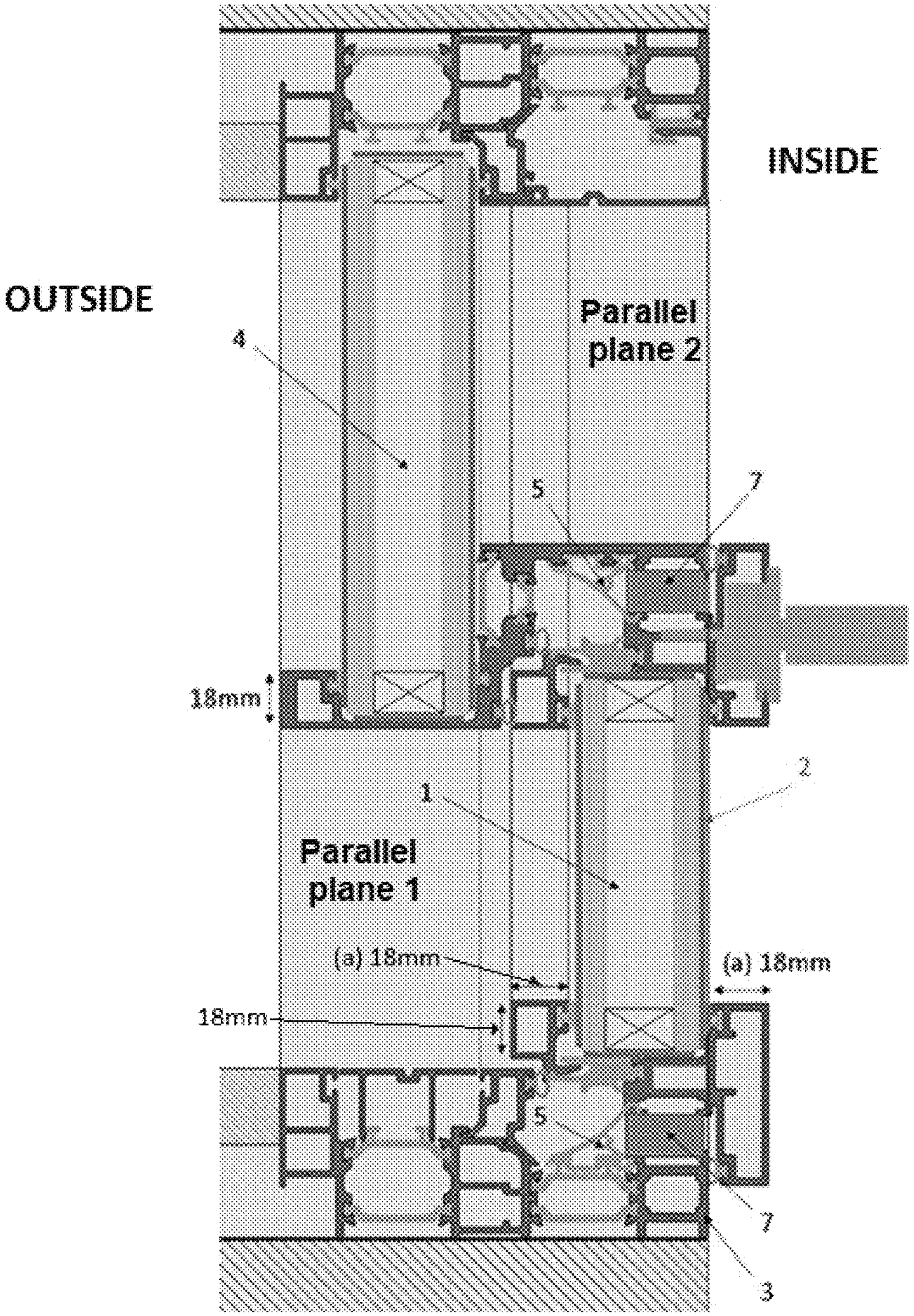
FIG. 1—Representation of a horizontal cut of the present invention in a preferred embodiment, in which it presents one fixed rim (3), a movable leaf (1) and a fixed leaf (4), which are made of glass (2). In this representation is possible to observe the central seals (5), located on the sides of the movable leaf (1), as well as the fitting (7) housed in this seal (5). Here the overlapping of the leaves (1) and (4) can be check as well as the common central outer profile, since the central profile of the movable leaf (1) is in the overlapping area.
Figure 2:
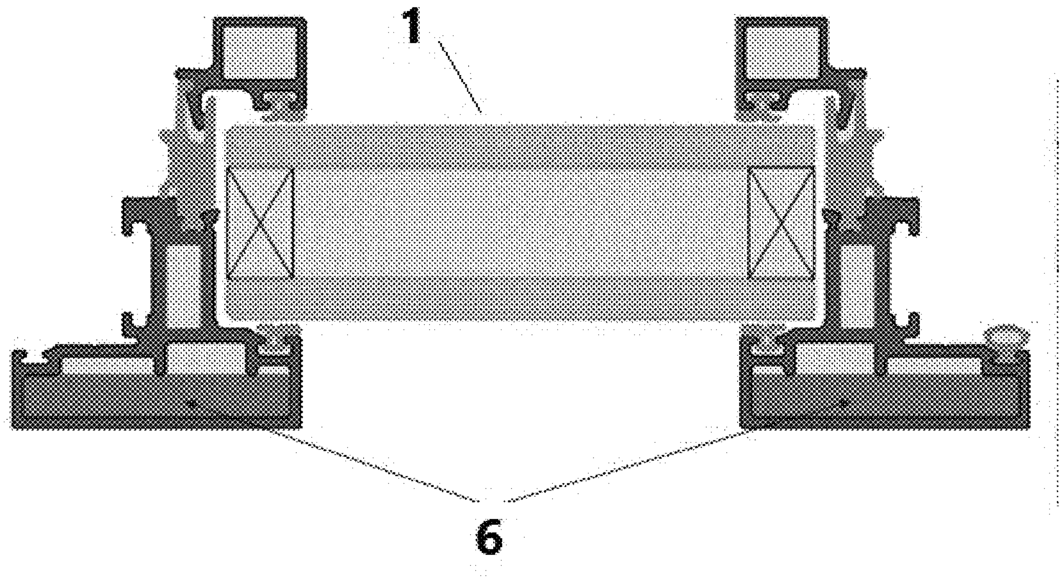
FIG. 2—Representation of a horizontal cut of a movable leaf (1) in which the reinforcing element (6) is visible.
Figure 3:
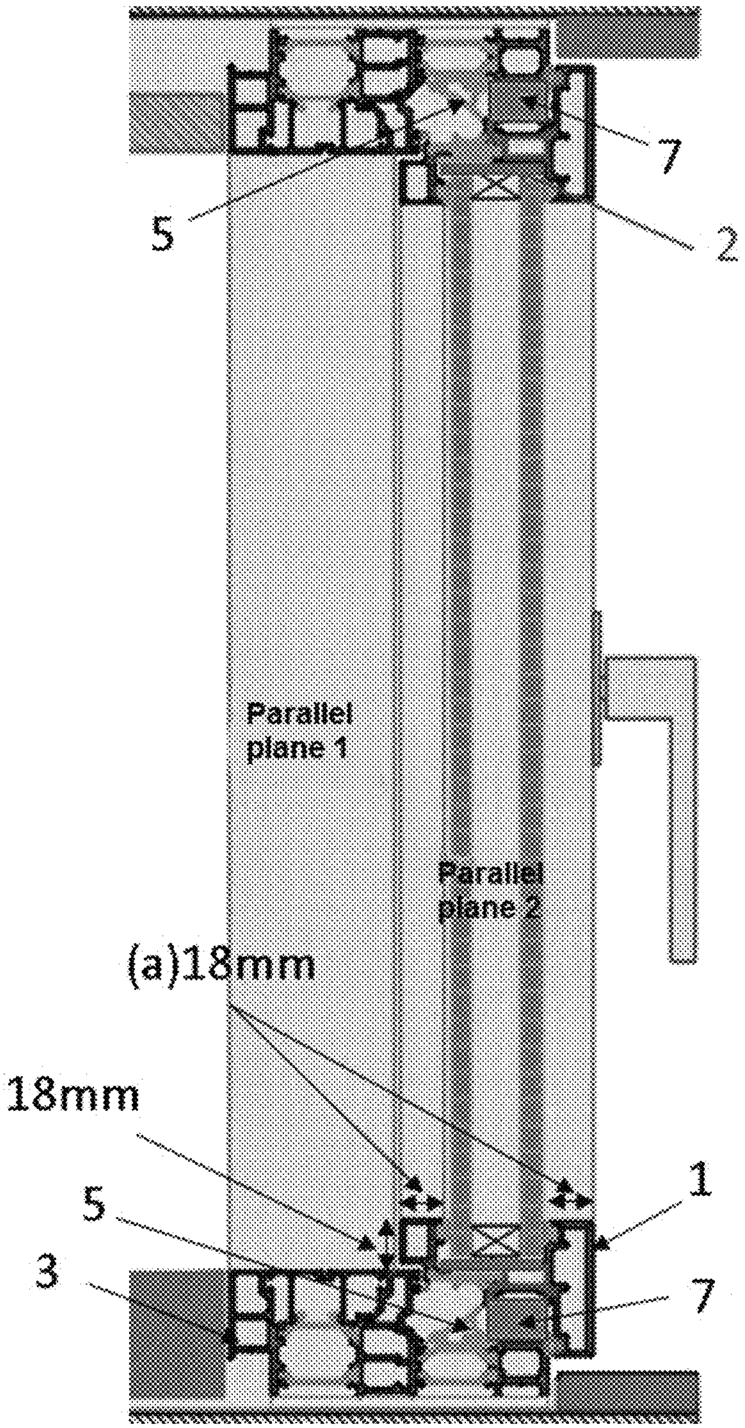
FIG. 3—Representation of a vertical cut of the present invention, where the seal (5) and the fitting (7), located in the fixed rim (3), are represented relative to the movable leaf (1).

This invention consists of an aluminum frame with thermal break for the manufacture of doors and/or windows, which is applied to a door or window opening in a building and consists essentially of at least one fixed rim (3) and at least one movable leaf (1) and at least one fixed leaf (4), wherein at least one movable leaf (1) is glued to the glass (2). The glue used to join the glass to aluminum is structural glue, which is an adhesive with high mechanical strength and high adhesive strength after curing.

The gluing of the glass (2) eliminates warping of aluminum profiles due to the size and weight of the glass. The movable leaf (1) can be reinforced with a reinforcement element (6), preferably made of steel, so that there is an increase in the inertia of the movable leaf (1).

The glass (2) can be single, double or triple and its thickness may vary between 20 mm and 50 mm.

Movable leaves (1) and fixed leaves (4), regardless their quantity or combination, are located in parallel planes, not coinciding, with a central overlapping area, in such a way that, from the outside, only a common central profile, preferably 18 mm, is visible, since the profile of the movable leaf (1) is in the overlapping area and therefore is only visible from the inside, since the outer side of the central profile of the movable leaf (1) is completely overlapped by the fixed leaf (4). The outer profile that is visible is nothing more than the perimeter thickness of a fixed leaf (4).

The outer central aluminum section of the movable leaf (1) is just 18 mm, and the fixed rim (3) can be hidden or not. The perimeter thickness (a) of the movable leaf (1) is the same on both sides of the glass (2), inside and outside, i.e., equal to 18 mm.

Movable leaves (1) and fixed leaves (4), in addition to other possible combinations, can be located relatively to each other according to the following configurations, but not restricted to them:

(i) movable leaf (1) followed by fixed leaf (4); or (ii) movable leaf (1) followed by fixed leaf (4) followed by movable leaf (1); or (iii) fixed leaf (4) followed by movable leaf (1) followed by fixed leaf (4);

are in parallel but not coincident planes, wherein this innovation allows a 18 mm outer perimeter section of the leaf (1) (4), as well as a common outer profile of 18 mm.

Moreover, the frames has in its constitution a central seal (5) and a hidden fitting (7), wherein this fitting must be housed between the fixed rim (3) and the movable leaf (1), which is known in the state of the art, however, in order to increase the space between the fitting (7) and the central seal (5), where this central seal (5) has a geometry suitable to house the fitting (7), without the central seal (5) being separated from the leaf (1) when the window is closed, thus improving the performance in the resistance to water and wind, thermal insulation and correct functioning of the fitting (7).

The invention claimed is:

1. A frame for turn & tilt doors or windows, consisting of at least one fixed rim (3), at least one movable leaf (1), at least one fixed leaf (4), at least one glass (2) inserted in the at least one movable leaf (1), and the at least one movable leaf (1) being characterized in that:

(a) the at least one movable leaf (1) is glued to the whole perimeter of the glass (2) such that the glass is a structural part of the leaf;

(b) the at least one movable leaf (1) and the at least one fixed leaf (4) are located in parallel but not coinciding planes, and have at least one overlapping area in such a way that the outside of the central profile of the movable leaf (1) is completely overlapped by the fixed leaf (4);

wherein the frame is devoid of sliding tracks.

2. The frame according to the previous claim, characterized in that the movable leaf (1) has a reinforcing element.

3. The frame according to claim 1, characterized in that the frame has a central seal (5) and a hidden fitting (7), wherein this fitting (7) is housed between the fixed rim (3) and the central seal (5) and has a geometry suitable to accommodate the fitting (7) without the central seal (5) being separated from the leaf (1) when the movable leaf is closed.

4. The frame according to claim 1, characterized in that the glass (2) is single, double or triple and its thickness may vary between 20 mm and 50 mm.

5. The frame according to claim 1, characterized in that the perimeter thickness (a) of the movable leaf (1) inside and outside, relative to the glass (2) is the same.

6. The frame of claim 2, wherein the reinforcing element is made of steel.

7. The frame of claim 5, wherein the perimeter thickness is equal to 18 mm.

* * * * *